United States Patent
Squitiero et al.

(10) Patent No.: US 12,294,247 B2
(45) Date of Patent: May 6, 2025

(54) ROTOR FOR A ROTATING ELECTRIC MACHINE, AND ROTATING ELECTRIC MACHINE

(71) Applicant: VALEO EQUIPEMENTS ELECTRIQUES MOTEUR, Creteil (FR)

(72) Inventors: Thomas Squitiero, Creteil (FR); Alexis Rivals, Creteil (FR); Pascal Tournaire, Creteil (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 220 days.

(21) Appl. No.: 17/906,578

(22) PCT Filed: Mar. 18, 2021

(86) PCT No.: PCT/EP2021/057005
§ 371 (c)(1),
(2) Date: Sep. 16, 2022

(87) PCT Pub. No.: WO2021/191052
PCT Pub. Date: Sep. 30, 2021

(65) Prior Publication Data
US 2023/0146846 A1  May 11, 2023

(30) Foreign Application Priority Data
Mar. 24, 2020  (FR) ..................... 2002831

(51) Int. Cl.
*H02K 1/28* (2006.01)
*H02K 1/27* (2022.01)
*H02K 1/274* (2022.01)

(52) U.S. Cl.
CPC ............ *H02K 1/28* (2013.01); *H02K 1/27* (2013.01); *H02K 1/274* (2013.01)

(58) Field of Classification Search
CPC .......... H02K 1/27; H02K 1/28; H02K 1/2773; H02K 2213/03; H02K 29/03; H02K 1/276; H02K 1/274; H02K 1/2706; H02K 1/2766

(Continued)

(56) References Cited

U.S. PATENT DOCUMENTS

| 6,147,429 A | * | 11/2000 | Akemakou | .......... H02K 21/042 310/263 |
| 2014/0354104 A1 | * | 12/2014 | Bouarroudj | .......... H02K 1/2773 310/156.43 |
| 2015/0244218 A1 | | 8/2015 | Kaufmann et al. | |

FOREIGN PATENT DOCUMENTS

| DE | 10 2013 009 115 A1 | 3/2014 | |
| EP | 3 324 522 A1 | 5/2018 | |
| WO | WO-2013168295 A1 * | 11/2013 | ........... H02K 1/2773 |

OTHER PUBLICATIONS

Toyota et al, Rotating Electrical Machine, Nov. 14, 2013, WO 2013168295 (English Machine Translation) (Year: 2013).*

(Continued)

*Primary Examiner* — Alexander A Singh
(74) *Attorney, Agent, or Firm* — Oblon, McClelland, Maier & Neustadt, L.L.P.

(57) ABSTRACT

A rotor for a rotary electric machine that rotates with respect to an axis of rotation, includes a body and permanent magnets. The body includes a plurality of rotor teeth defining cavities in which the permanent magnets are accommodated, each rotor tooth including at least one holding part. The holding part includes a holding portion having a holding face against which a radially outermost face of the permanent magnet bears, a wing remote from the radially outer- (Continued)

Figure 1:
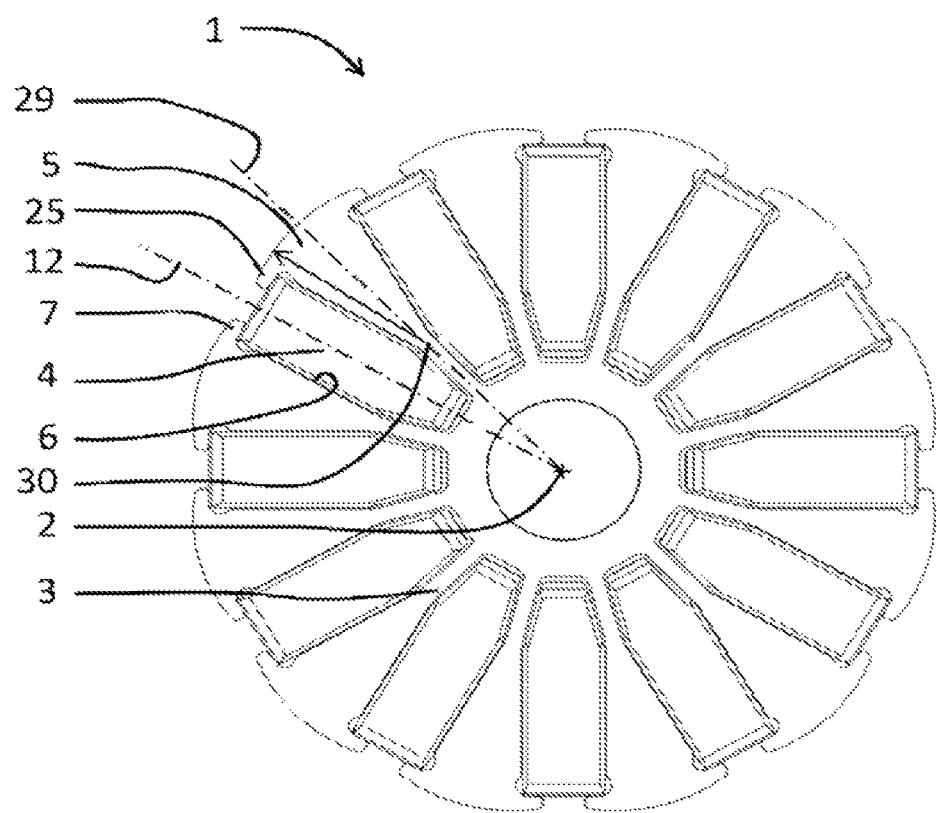

most face and in the circumferential continuation of the holding portion.

22 Claims, 3 Drawing Sheets

(58) Field of Classification Search
USPC .................................. 310/156.01, 156.56
See application file for complete search history.

(56) References Cited

OTHER PUBLICATIONS

International Search Report issued Apr. 13, 2021, in PCT/EP2021/057005 filed Mar. 18, 2021, citing documents 1 and 15-17 therein, 2 pages.

\* cited by examiner

ROTOR FOR A ROTATING ELECTRIC MACHINE, AND ROTATING ELECTRIC MACHINE

The present invention relates to rotor of a rotary electric machine, in particular for a motor vehicle, and to a rotary electric machine equipped with such a rotor. FR2983657A1 discloses a rotor for a rotary electric machine, which is able to interact with a stator of the rotary electric machine and rotates with respect to an axis of rotation, the rotor comprising:
a body,
permanent magnets,
the body comprising a plurality of rotor teeth defining cavities in which the permanent magnets are accommodated, and
each rotor tooth comprising at least one holding part, the holding part comprising a holding portion comprising a holding face against which a radially outermost face of the permanent magnet bears flat.

This type of rotor has the drawback of generating torque ripples while it is being used in a rotary electric machine. These torque ripples are a source of undesirable noise during operation. This is because this torque ripple creates a vibration commonly referred to as magnetic noise and may also generate noise in the mechanical assemblies rotationally connected directly or indirectly to the rotor, in particular in gears. Moreover, in particular when the electric machine is used as a generator, an undesirable ripple in the current provided by the machine may be generated.

The present invention seeks to overcome all or some of these drawbacks.

The invention relates to a rotor for a rotary electric machine, which is able to interact with a stator of the rotary electric machine and rotates with respect to an axis of rotation, the rotor comprising:
a body,
permanent magnets,
the body comprising a plurality of rotor teeth defining cavities in which the permanent magnets are accommodated,
each rotor tooth comprising at least one holding part, the holding part comprising:
a holding portion comprising a holding face against which a radially outermost face of the permanent magnet bears,
a wing remote from the radially outermost face and in the circumferential continuation of the holding portion.

The use of a wing remote from the radially outermost face of the permanent magnet makes it possible to continue the holding part of the rotor tooth and therefore its circumferential extent for interaction with the stator. A reduction in the torque ripple and therefore in noise is thus possible. Moreover, the use of a remote wing has the effect of reducing the thickness of the wing and therefore its mass. Thus, it is possible to obtain good integrity of the holding part of the rotor tooth under centrifugal effects by virtue of a reduction in the mechanical stresses at the base of the holding part, that is to say in the connecting region between the holding part and the rest of the rotor tooth. A reduction in the mechanical stresses is also obtained through the lack of contact between the permanent magnet and the wing, that is to say at the end part of the holding part. Since the contact between the permanent magnet and the holding part is as close as possible to the base of the holding part, a reduction in the bending moment and therefore in the stresses at the base of the holding part is possible. Since a region of the holding part, corresponding to the wing, is not in contact with the permanent magnet, better channelling of the magnetic flux is rendered possible. It is thus possible to improve the torque of the electric machine in which the rotor can be used.

According to an additional feature of the invention, the radially outermost face has a first plane of symmetry parallel to the axis of rotation, and
the holding portion has a first end, with a first thickness, on a second plane parallel to the first plane and passing through an end part of the holding face, and
the wing extends circumferentially between the first end and a free second end,
the second end being at a first distance from the radially outermost face of the permanent magnet,
the first end being at a second distance from the first plane,
the first end and the third end being at a third distance from one another,
the ratio between the third distance and the second distance being between 0.09 and 0.45, in particular between 0.13 and 0.23, and the ratio between the first thickness and the first distance being between 0.04 and 0.86, in particular between 0.07 and 0.17.

Such dimensional ratios make it possible to reduce torque ripples and therefore the noise of the electric machine.

According to an additional feature of the invention, the distance of the wing from the radially outermost face of the permanent magnet increases between the first end and the second end.

Such a feature makes it possible to improve the magnetic flux in the holding part. Specifically, it makes it possible to limit abrupt variations in thickness in the holding part, which would have the effect of locally causing concentrations of magnetic flux and a reduction in the performance of the machine, and in particular a lowering of the torque of the machine.

According to an additional feature of the invention, a radially internal face of the wing is planar and forms an angle with the tangent to the radially outer face of the permanent magnet at the end part of the holding face.

Such a wing shape makes it possible to further improve the distribution of the magnetic flux and therefore the performance of the electric machine.

According to an additional feature of the invention, each permanent magnet comprises, at a radially outer end, a bearing plate, the radially outermost face of each permanent magnet being formed on the bearing plate.

The use of a bearing plate makes it possible, by virtue of the relative flexibility of the bearing plate, to improve the contact between the holding face of the holding portion and the magnetic part of the permanent magnet.

According to an additional feature of the invention, each rotor tooth comprises a first holding part and a second holding part.

The use of two holding parts per rotor tooth makes it possible to improve the retention of the permanent magnet accommodated between two consecutive rotor teeth.

According to an additional feature of the invention, the first holding part and the second holding part are symmetric with respect to the first plane, the first holding part and the second holding part forming part of two consecutive rotor teeth holding one and the same permanent magnet.

According to an additional feature of the invention, each of the permanent magnets has the first plane as plane of symmetry.

According to an additional feature of the invention, the first plane passes through the axis of rotation.

According to an additional feature of the invention, the radially outermost face of the permanent magnet is planar.

The invention also relates to a rotary electric machine comprising a rotor as described above.

Throughout the preceding text, the rotary electric machine may have a stator having a polyphase electric winding, for example formed by wires or by conducting bars connected to one another.

The rotary electric machine may comprise a power electronics component that is able to be connected to the on-board network of a vehicle. This power electronics component comprises for example an inverter/rectifier that allows an on-board network of the vehicle to be charged, or that can be electrically powered by this network, depending on whether the electric machine is operating as a motor or as a generator.

The rotary electric machine may further comprise a pulley or any other means of connection to the rest of the powertrain of the vehicle. The rotary electric machine is, for example, connected, in particular via a belt, to the crankshaft of the combustion engine of the vehicle. In a variant, the electric machine is connected at other locations in the powertrain, for example at the input of the gearbox with regard to the torque passing toward the wheels of the vehicle, at the output of the gearbox with regard to the torque passing toward the wheels of the vehicle, at the gearbox with regard to the torque passing toward the wheels of the vehicle, or on the front axle assembly or the rear axle assembly of this powertrain.

Figure 2:
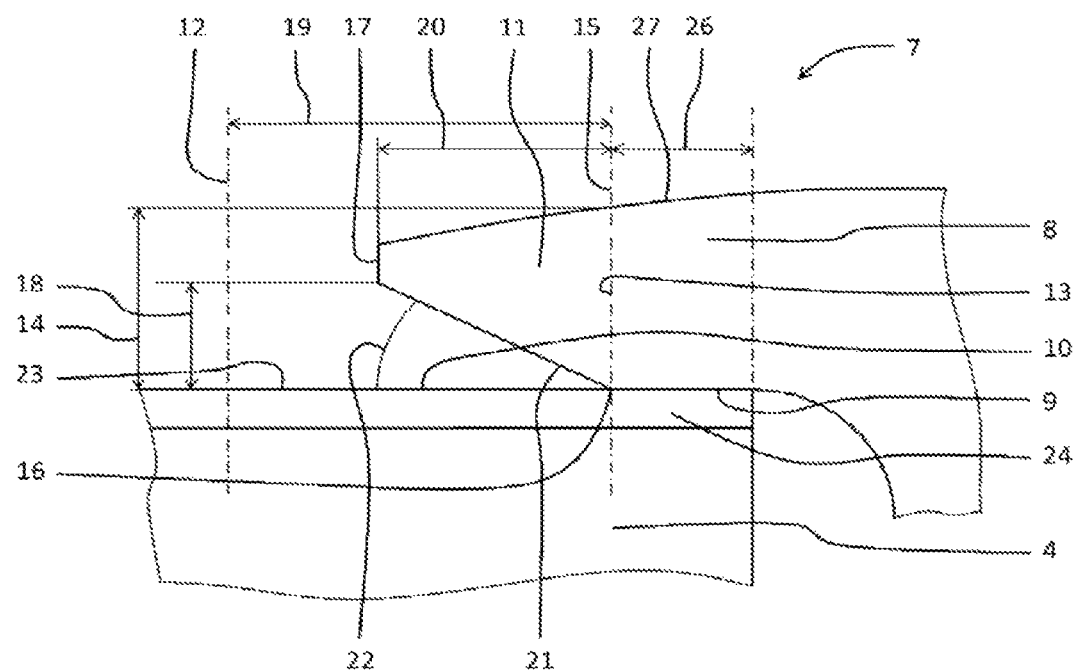
Figure 3:
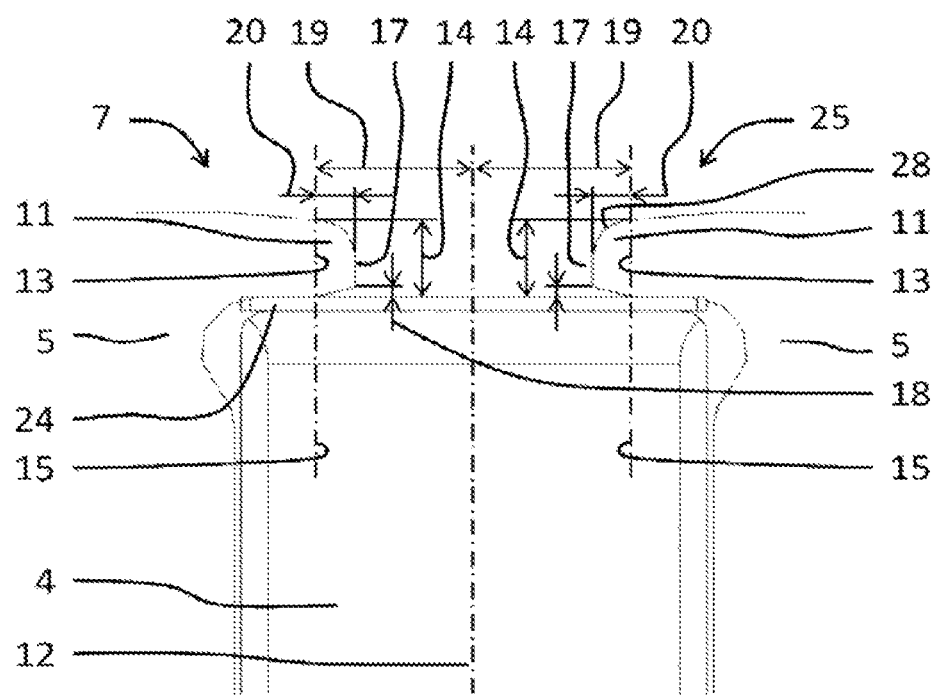

The invention may be understood better upon reading the following description of non-limiting implementation examples thereof and upon studying the appended drawing, in which:

FIG. 1 shows a partial view of a rotor of a rotary electric machine according to one embodiment of the invention, FIG. 2 shows a partial schematic view of the rotor in FIG. 1, FIG. 3 depicts another view in cross section of the rotor in FIG. 1.

Throughout the figures, elements that are identical or perform the same function bear the same reference numbers. The following embodiments are examples. Although the description refers to one or more embodiments, this does not necessarily mean that each reference relates to the same embodiment, or that the features apply only to one embodiment. Individual features of different embodiments may also be combined or interchanged to provide other embodiments.

FIG. 1 shows a rotor 1 of a rotary electric machine. The rotor 1 rotates with respect to an axis 2 of rotation. The rotor is able to interact with a stator (not shown), in particular a stator comprising a body, for example a stack of magnetic laminations, and a polyphase electric winding. The rotor comprises a body 3 and permanent magnets 4.

The body 3 comprises a plurality of rotor teeth 5 defining cavities 6 in which the permanent magnets 4 are accommodated. The body 3 comprises for example a stack of magnetic laminations. The body 3 may have, in its central part, a housing in which the shaft of the rotor is fitted.

Each rotor tooth 5 comprises at least one holding part 7, 25. The holding part 7, 25 holds a permanent magnet 4 radially toward the outside.

The holding part 7, 25 comprises a holding portion 8. The holding portion 8 comprises a holding face 9 against which a radially outermost part 10 of the permanent magnet 4 bears.

The radially outermost face 10 of the permanent magnet 4 is, for example, planar as in the embodiments shown in the figures. The holding face 9 is then also planar.

In another embodiment that is not shown, the radially outermost face is curved and the holding face has a shape complementary to the radially outermost face and is therefore likewise curved in a contact region between the radially outermost face and the holding face.

The holding part also comprises a wing 11 in the circumferential continuation of the holding portion 8.

The wing 11 is remote from the radially outermost face 10.

For example, the distance of the wing 11 from the radially outermost face 10 of the permanent magnet 4 increases as it extends away from the holding portion 8.

In another embodiment that is not shown, the wing is at a constant distance from the radially outermost face of the permanent magnet.

The radially outermost face may have a first plane 12 of symmetry parallel to the axis of rotation 2.

In the embodiments shown in the figures, the first plane 12 passes through the axis of rotation 2.

In another embodiment that is not shown, the first plane of symmetry does not pass through the axis of rotation.

The holding portion comprises a first end 13 with a first thickness 14. The first thickness 14 is measured at a second plane 15 parallel to the first plane 12. The second plane 15 passes through an end part 16 of the holding face 9.

The wing extends between the first end 13 and a free second end 17.

The second end 17 comprises, for example, an end face, circumferentially speaking, which is planar, for example parallel to the first plane 12. As presented in FIG. 1 and FIG. 3, the second end 17 may comprise a fillet 28 in a radially outermost part.

In another embodiment that is not shown, the second end may have a fillet in a radially innermost part.

The second end 17 is at a first distance 8 from the radially outermost face 10 of the permanent magnet 4.

The first end 13 is at a second distance 19 from the first plane 12. The first end 13 and the second end 17 are at a third distance 20 from one another.

The ratio between the third distance 20 and the second distance 19 is between 0.09 and 0.45, in particular between 0.13 and 0.23, in particular 0.18. The ratio between the first thickness 14 and the first distance 18 is between 0.04 and 0.86, in particular between 0.07 and 0.17, in particular 0.12.

Each rotor tooth 5 may have, on its radially outermost part, a curved surface 27 with a radius less than or equal to the radius of the rotor 1. The center of the curvature 30 of the curved surface 27 is for example on a third plane 29 of symmetry of the rotor tooth 5.

As shown in the figures, the distance of the wing 11 from the radially outermost face 10 of the permanent magnet 4 may increase between the first end 13 and the second end 17.

The wing 11 may, in particular, have a planar radially internal face 21. The radially internal face 21 forms an angle 22 with the tangent to the radially outer face 10 of the permanent magnet 4 at the end part 16 of the holding face 9, as shown in FIG. 2.

In the embodiments shown in the figures, the radially outer face 10 of the permanent magnet 4 is planar. The radially internal face 21 therefore forms an angle 22 with the radially outer face 10 of the permanent magnet 4.

The permanent magnet 4 may comprise, at a radially outer end 23, a bearing plate 24, also known as a strip. The permanent magnet 4 may therefore comprise a magnetic part and the bearing plate. Such a bearing plate 24 is manufactured from a material that is more flexible than the magnetic part. The bearing plate 24 is made for example of a plastics or composite material, in particular a resin filled with glass fibers. The bearing plate 24 is positioned between the holding face 9 of the holding portion 8 and the magnetic part of the permanent magnet 4. The bearing plate 24 makes it possible to improve the contact between the holding face 9 of the holding portion 8 and the magnetic part of the permanent magnet 4. Two rotor teeth 5 may comprise a first holding part 7 and a second holding part 25, as shown in FIG. 1 and FIG. 3. The first holding part 7 and the second holding part 25 of the two consecutive rotor teeth hold one and the same permanent magnet 4.

The first holding part 7 and the second holding part 25 may be symmetric with respect to the first plane 12. The first holding part 7 and the second holding part 25 form part of two consecutive rotor teeth that hold one and the same permanent magnet 4.

Each permanent magnet 4 may have a first plane 12 as plane of symmetry. The rotor 1 has the same number of first planes 12 and permanent magnets 4. In the embodiments in which the number of permanent magnets is even, the first plane 12 of a first permanent magnet 4 is coincident with the first plane 12 of a second permanent magnet that is opposite it with respect to the axis of rotation 2.

In another embodiment, which is not shown, each rotor tooth has only one holding part.

The magnetic part of the permanent magnets 4 is for example of the ferrite type.

The invention claimed is:

1. A rotor comprising:
a body,
permanent magnets,
the body comprising a plurality of rotor teeth defining cavities in which the permanent magnets are accommodated,
each rotor tooth comprising at least one holding part, the holding part comprising:
a holding portion comprising a holding face against which a radially outermost face of the permanent magnet bears,
a wing remote from the radially outermost face and in the circumferential continuation of the holding portion,
wherein the radially outermost face has a first plane of symmetry parallel to the axis of rotation, and wherein the holding portion has a first end, with a first thickness, on a second plane parallel to the first plane and passing through an end part of the holding face, and wherein the wing extends circumferentially between the first end and a free second end, the second end being at a first distance from the radially outermost face of the permanent magnet,
the first end being at a second distance from the first plane,
the first end and the second end being at a third distance from one another,
the ratio between the third distance and the second distance being between 0.09 and 0.45, and the ratio between the first thickness and the first distance being between 0.04 and 0.86.

2. The rotor as claimed in claim 1, wherein the distance of the wing from the radially outermost face of the permanent magnet increases between the first end and the second end.

3. The rotor as claimed in claim 2, wherein a radially internal face of the wing is planar and forms an angle with the tangent to the radially outer face of the permanent magnet at the end part of the holding face.

4. The rotor as claimed in claim 2, wherein each permanent magnet comprises, at a radially outer end, a bearing plate, the radially outermost face of each permanent magnet being formed on the bearing plate.

5. The rotor as claimed in claim 2, wherein each rotor tooth comprises a first holding part and a second holding part.

6. The rotor as claimed in claim 2, wherein each of the permanent magnets has the first plane as plane of symmetry.

7. The rotor as claimed in claim 2, wherein the first plane passes through the axis of rotation.

8. A rotary electric machine comprising a rotor as claimed in claim 2.

9. The rotor as claimed in claim 1, wherein a radially internal face of the wing is planar and forms an angle with the tangent to the radially outer face of the permanent magnet at the end part of the holding face.

10. The rotor as claimed in claim 9, wherein each permanent magnet comprises, at a radially outer end, a bearing plate, the radially outermost face of each permanent magnet being formed on the bearing plate.

11. The rotor as claimed in claim 9, wherein each rotor tooth comprises a first holding part and a second holding part.

12. The rotor as claimed in claim 9, wherein each of the permanent magnets has the first plane as plane of symmetry.

13. The rotor as claimed in claim 9, wherein the first plane passes through the axis of rotation.

14. A rotary electric machine comprising a rotor as claimed in claim 9.

15. The rotor as claimed in claim 1, wherein each permanent magnet comprises, at a radially outer end, a bearing plate, the radially outermost face of each permanent magnet being formed on the bearing plate.

16. The rotor as claimed in claim 1, wherein each rotor tooth comprises a first holding part and a second holding part.

17. The rotor as claimed in claim 16, wherein the first holding part and the second holding part are symmetric with respect to the first plane, the first holding part and the second holding part forming part of two consecutive rotor teeth holding one and the same permanent magnet.

18. The rotor as claimed in claim 1, wherein each of the permanent magnets has the first plane as plane of symmetry.

19. The rotor as claimed in claim 1, wherein the first plane passes through the axis of rotation.

20. A rotary electric machine comprising:
the rotor as claimed in claim 1.

21. The rotor as claimed in claim 1, wherein the ratio between the third distance and the second distance being between 0.13 and 0.23.

22. The rotor as claimed in claim 1, wherein the ratio between the first thickness and the first distance is between 0.07 and 0.17.

* * * * *